US007336605B2

United States Patent
Bruckman et al.

(10) Patent No.: US 7,336,605 B2
(45) Date of Patent: Feb. 26, 2008

(54) BANDWIDTH ALLOCATION FOR LINK AGGREGATION

(75) Inventors: Leon Bruckman, Petah Tikva (IL); Gal Mor, Herzliya (IL); Zvi Menahemi, Modiin (IL)

(73) Assignee: Corrigent Systems, Inc., Tel Aviv (IL)

( * ) Notice: Subject to any disclaimer, the term of this patent is extended or adjusted under 35 U.S.C. 154(b) by 933 days.

(21) Appl. No.: 10/436,516

(22) Filed: May 13, 2003

(65) Prior Publication Data

US 2004/0228278 A1 Nov. 18, 2004

(51) Int. Cl.
*H04J 13/06* (2006.01)
(52) U.S. Cl. .................. 370/230; 370/395.21; 370/468
(58) Field of Classification Search ................ 370/468, 370/395.43, 412, 392, 401
See application file for complete search history.

(56) References Cited

U.S. PATENT DOCUMENTS

| | | | | |
|---|---|---|---|---|
| 5,933,422 | A * | 8/1999 | Kusano et al. ............... | 370/331 |
| 6,032,194 | A | 2/2000 | Gai et al. | |
| 6,169,783 | B1 * | 1/2001 | Brooks et al. ................. | 379/9 |
| 6,370,121 | B1 | 4/2002 | Hausman | |
| 6,560,231 | B1 * | 5/2003 | Kawakami et al. .... | 370/395.43 |
| 6,624,917 | B1 * | 9/2003 | Paschal et al. .............. | 398/187 |
| 6,625,155 | B1 * | 9/2003 | Dziong .................... | 370/395.2 |
| 6,678,241 | B1 | 1/2004 | Gai et al. | |
| 6,757,286 | B1 | 6/2004 | Stone | |
| 6,763,025 | B2 * | 7/2004 | Leatherbury et al. .. | 370/395.64 |
| 6,801,506 | B1 | 10/2004 | Dey | |
| 6,826,147 | B1 | 11/2004 | Nandy et al. | |
| 6,826,158 | B2 | 11/2004 | Seaman et al. | |
| 6,922,394 | B2 | 7/2005 | Kajiwara | |
| 6,934,259 | B2 | 8/2005 | Klincewicz et al. | |
| 7,158,486 | B2 * | 1/2007 | Rhodes ........................ | 370/256 |

(Continued)

FOREIGN PATENT DOCUMENTS

| | | |
|---|---|---|
| EP | 1 052 808 | 11/2000 |
| WO | WO 00/74318 | 12/2000 |

OTHER PUBLICATIONS

Dziong, Zbigniew, et al., "A Framework for Bandwidth Management in ATM Networks—Aggregate Equivalent Bandwidth Estimation Approach," IEEE/ACM Transactions on Networking, vol. 5, No. 1, Feb. 1997.*
Inverse Multiplexing over ATM, Strategic Technologies Group, Jul. 12, 2001.*
The PPP Multilink Protocol (MP) Standard, Request For Comments: 1990 (RFC 1990), The Internet Engineering Task Force, www.ietf.org, Aug. 1996.*

(Continued)

*Primary Examiner*—Ricky Q. Ngo
*Assistant Examiner*—Ankit P Gandhi
(74) *Attorney, Agent, or Firm*—Welsh & Katz, Ltd.

(57) ABSTRACT

A method for establishing a connection with a guaranteed bandwidth for transmitting data over a logical link that includes a plurality of parallel physical links between first and second endpoints. A link bandwidth is allocated on each of the physical communication links so as to include a predefined safety margin, based on either a failure protection policy, or a measure of fluctuation that occurs in a rate of data transmission over the physical links, or both. A sum of the allocated link bandwidth over the plurality of the parallel physical links is substantially greater than the guaranteed bandwidth of the connection. The data are conveyed over the logical link by distributing the data for transmission among the physical links in accordance with the allocated link bandwidth.

18 Claims, 3 Drawing Sheets

U.S. PATENT DOCUMENTS

| | | | |
|---|---|---|---|
| 7,184,402 B1* | 2/2007 | Sharma et al. | 370/232 |
| 2002/0186661 A1 | 12/2002 | Santiago et al. | |
| 2003/0002443 A1 | 1/2003 | Basso et al. | |
| 2003/0055920 A1 | 3/2003 | Kakadia et al. | |
| 2003/0158930 A1* | 8/2003 | McBride | 709/223 |
| 2003/0223428 A1* | 12/2003 | Blanquer Gonzalez et al. | 370/395.4 |
| 2004/0071089 A1 | 4/2004 | Bauer et al. | |
| 2005/0030948 A1* | 2/2005 | Wyatt | 370/392 |

OTHER PUBLICATIONS

Townsley et al., in "Layer Two Tunneling Protocol (Version 3) 'L2TPv3'", (IETF draft-ietf-l2tpext-l2tp-base-04.txt, Nov. 2002 and Jan. 2003).

Bryant et al., in an IETF draft entitled "Protocol Layering in PWE3" (IETF draft-ietf-pwe3-protocol-layer-00-txt, May 2002).

Lasserre et al., in "Virtual Private LAN Services over MPLS" (IETF draft-lasserre-vkompella-ppvpn-vpls-02.txt, Jun. 2002 and Jan. 2003.

Sodder, et al., in an IETF draft entitled "Virtual Hierarchical LAN Services" (IETF draft-sodder-ppvpn-vhls-01.txt, Nov. 2002).

Rosen, et al., in Request for Comments (RFC) 3031 of the Internet Engineering Task Force (IETF), entitled: "Multiprotocol Label Switching Architecture", Jan. 2001. (Available at: www.ietf.org/rfc.html).

Martini, et al., in an IETF Draft Entitled: "Encapsulation Methods for transport of layer 2 Frames over MPLS", May 2001. (Available at: search.ietf.org/internet-drafts/draft-martini-12circuit-encap-mpls-02.txt.).

Martini, et al., Internet Draft, entitled: "Transport of Layer 2 Frames over MPLS", May 2001. (Available at: search.ietf.org/internet-drafts/draft-martini-12circuit-mpls-06.txt.).

"IEEE Standard for Information Technology, Telecommunications and Information Exchange between Systems, Local and Metropolitan Area Network, Common Specifications, Part 3: Media Access Control (MAC) Bridges", Published as ANSI/IEEE Standard 802.1D (1998). Available at: standards.ieee.org/catalog/IEEE802.1.html.

D. Tsiang et al., Request for Comments (RFC) 2892 of the Internet Engineering Task Force (IETF), Aug. 2000.

Clause 43 of IEEE Standard 802.3, Carrier Sense Multiple Access with Collision Detection (CSMA/CD) Access Method and Physical Layer Specifications (2002 Edition).

Cisco ONS 15454, available at: http://www.cisco.com/warp/public/cc/pd/olpl/metro/on15454/prodlit/wldvs_ds.htm. 2001.

IEEE 802.1:802.1W—Rapid Reconfiguration of Spanning Tree, 2001.

* cited by examiner

BANDWIDTH ALLOCATION FOR LINK AGGREGATION

FIELD OF THE INVENTION

The present invention relates generally to data communication systems, and specifically to methods and systems for link aggregation in a data communication network.

BACKGROUND OF THE INVENTION

Link aggregation is a technique by which a group of parallel physical links between two endpoints in a data network can be joined together into a single logical link. Traffic transmitted between the endpoints is distributed among the physical links in a manner that is transparent to the clients that send and receive the traffic. Link aggregation offers benefits of increased bandwidth, as well as increased availability, since the logical link can continue to function (possibly with reduced bandwidth) even when one of the physical links fails or is taken out of service.

For Ethernet networks, link aggregation is defined by Clause 43 of IEEE Standard 802.3, Carrier Sense Multiple Access with Collision Detection (CSMA/CD) Access Method and Physical Layer Specifications (2002 Edition), which is incorporated herein by reference. Clause 43 defines a link aggregation protocol sublayer, which interfaces between the standard Media Access Control (MAC) layer functions of the physical links in a link aggregation group and the MAC clients that transmit and receive traffic over the aggregated links. The link aggregation sublayer comprises a distributor function, which distributes data frames submitted by MAC clients among the physical links in the group, and a collector function, which receives frames over the aggregated links and passes them to the appropriate MAC clients.

The 802.3 standard does not impose any particular distribution algorithm on the distributor, other than forbidding frame duplication and requiring that frame ordering be maintained over all frames in a given "conversation." (Clause 1.4 of the standard defines a conversation as "a set of MAC frames transmitted from one end station to another, where all of the MAC frames form an ordered sequence, and where the communicating end stations require the ordering to be maintained among the set of MAC frames exchanged.") In practice, this requirement means that the distributor must pass all frames in a given conversation to the same physical port, for transmission over the same physical link.

Annex 43A of the 802.3 standard, which is also incorporated herein by reference, describes possible distribution algorithms that meet the requirements of the standard, while providing some measure of load balancing among the physical links in the aggregation group. The algorithm may make use of information carried in each Ethernet frame in order to make its decision as to the physical port to which the frame should be sent. The frame information may be combined with other information associated with the frame, such as its reception port in the case of a MAC bridge. The information used to assign conversations to ports could thus include one or more of the following pieces of information:

a) Source MAC address
b) Destination MAC address
c) Reception port
d) Type of destination address
e) Ethernet Length/Type value
f) Higher layer protocol information A hash function, for example may be applied to the selected information in order to generate a port number. Because conversations can vary greatly in length, however, it is difficult to select a hash function that will generate a uniform distribution of load across the set of ports for all traffic models.

Service level agreements between network service providers and customers commonly specify a certain committed bandwidth, or committed information rate (CIR), which the service provider guarantees to provide to the customer at all times, regardless of bandwidth stress on the network. Additionally or alternatively, the agreement may specify an excess bandwidth, which is available to the customer when network traffic permits. The excess bandwidth is typically used by customers for lower-priority services, which do not require committed bandwidth. The network service provider may guarantee the customer a certain minimum excess bandwidth, or excess information rate (EIR), in order to avoid starvation of such services in case of bandwidth stress. In general, the bandwidth guaranteed by a service provider, referred to as the peak information rate (PIR), may include either CIR, or EIR, or both CIR and EIR (in which case PIR=CIR−EIR). The term "guaranteed bandwidth," as used in the context of the present patent application and in the claims, includes all these types of guaranteed bandwidth.

SUMMARY OF THE INVENTION

When aggregated links are used to serve a given customer, the service provider may allocate a certain fraction of the bandwidth on each of the physical links in the aggregation group so that the aggregated logical link provides the total bandwidth guaranteed by the customer's service level agreement. Typically, however, the actual bandwidth consumed on each of the physical links fluctuates statistically due to the non-uniform distribution of load among the links in the aggregation group. Furthermore, if one of the physical links fails, the bandwidth consumed on the remaining links in the group will need to increase in order to maintain the minimum guaranteed total bandwidth on the aggregated logical link. Under these circumstances, the service provider may not be able to provide all customers with the minimum bandwidth guaranteed by their service level agreements.

Embodiments of the present invention provide methods for bandwidth allocation in a link aggregation system to ensure that sufficient bandwidth will be available on the links in the group in order to meet service guarantees, notwithstanding load fluctuations and link failures. Safety margins are calculated, based on a measure of load fluctuation and on the level of protection to be provided (i.e., the worst-case number of link failures that must be tolerated by the system). These safety margins are applied in determining the bandwidth to be allocated for guaranteed services on each physical link in the aggregation group.

In other words, if the bandwidth guaranteed to a certain customer is B, and the customer is served by an aggregation group of N links, the minimum guaranteed bandwidth that could be allocated on each of the links would be B/N. The safety margins indicate the amount by which the bandwidth allocation must be increased above B/N in order to fulfill the guaranteed bandwidth requirement of the service level agreement. Any remaining excess bandwidth on the links in the aggregation group can be used for non-guaranteed, "best-effort" services.

Although the embodiments described herein refer specifically to link aggregation in Ethernet (IEEE 802.3) networks, the principles of the present invention may similarly be used in other types of link aggregation, such as Inverse Multiplexing over ATM (IMA) and multi-link connections using the Point-to-Point (PPP) protocol.

There is therefore provided, in accordance with an embodiment of the present invention, a method for establishing a connection with a guaranteed bandwidth for transmitting data between first and second endpoints, the method including:

defining a logical link including a plurality of parallel physical links between the endpoints;

setting a protection policy to be applied to the logical link;

allocating a link bandwidth on each of the physical communication links for use in conveying the data between the endpoints such that the allocated link bandwidth includes a predefined safety margin based on the protection policy, so that a sum of the allocated link bandwidth over the plurality of the parallel physical links is substantially greater than the guaranteed bandwidth of the connection; and conveying the data over the logical link by distributing the data for transmission among the physical links in accordance with the allocated link bandwidth.

Typically, defining the logical link includes defining a link aggregation group in accordance with IEEE standard 802.3. Alternatively, the physical links may include Asynchronous Transfer Mode (ATM) links, and defining the logical link may include grouping the physical links for Inverse Multiplexing over ATM (IMA) Further alternatively, defining the logical link may include defining a multi-link connection in accordance with a Point-to-Point (PPP) protocol.

In a disclosed embodiment, the data include a sequence of data frames having respective headers, and distributing the data includes applying a hash function to the headers to select a respective one of the physical links over which to transmit each of the data frames.

Typically, setting the protection policy includes determining a maximum number of the physical links that may fail while the logical link continues to provide at least the guaranteed bandwidth for the connection. In one embodiment, the guaranteed bandwidth is a bandwidth B, and the plurality of physical links consists of N links, and the maximum number is an integer P, and the link bandwidth allocated to each of the links is no less than $B/(N-P)$. Conveying the data may further include managing the transmission of the data responsively to an actual number X of the physical links that have failed so that the guaranteed bandwidth on each of the links is limited to $B/(N-X)$, $X \leq P$, and an excess bandwidth on the physical links over the guaranteed bandwidth is available for other connections.

Additionally or alternatively, the method may include determining a measure of fluctuation that occurs in a rate of data transmission over the physical links when the data are distributed for transmission among the physical links, wherein the safety margin is further based on the measure of fluctuation. A safety factor F may be set responsively to the measure of fluctuation, wherein the link bandwidth allocated to each of the links is a minimum of B and $F*B/(N-P)$.

There is also provided, in accordance with an embodiment of the present invention, a method for establishing a connection with a guaranteed bandwidth for transmitting data between first and second endpoints, the method including:

defining a logical link including a plurality of parallel physical links between the endpoints;

determining a measure of fluctuation that occurs in a rate of transmission of the data over the physical links when the data are distributed for transmission among the physical links;

allocating a link bandwidth on each of the physical communication links for use in conveying the data between the endpoints such that the allocated link bandwidth includes a predefined safety margin based on the measure of fluctuation, so that a sum of the allocated link bandwidth over the plurality of the parallel physical links is substantially greater than the guaranteed bandwidth of the connection; and conveying the data over the logical link by distributing the data for transmission among the physical links in accordance with the allocated link bandwidth.

Typically, the guaranteed bandwidth is a bandwidth B, and the link bandwidth allocated to each of the links is no less than $F*B/N$, wherein F is a factor determined by the measure of fluctuation.

In one embodiment, determining the measure of fluctuation includes finding a standard deviation of the rate of transmission. In another embodiment, determining the measure of fluctuation includes finding a difference between an average level of utilization of all of the plurality of parallel physical links and a maximum level of utilization of any one of the physical links.

There is also provided, in accordance with an embodiment of the present invention, apparatus for establishing a connection with a guaranteed bandwidth for transmitting data between first and second endpoints over a logical link that includes a plurality of parallel physical links between the endpoints, in accordance with a protection policy to be applied to the logical link, the apparatus including:

a controller, which is adapted to allocate a link bandwidth on each of the physical communication links for use in conveying the data between the endpoints such that the link bandwidth includes a predefined safety margin based on the protection policy, so that a sum of the allocated link bandwidth over the plurality of the parallel physical links is substantially greater than the guaranteed bandwidth of the connection;

a distributor, which is adapted to determine a distribution of the data for transmission among the physical links in accordance with the allocated link bandwidth; and data transmission circuitry, which is adapted to transmit the data over the physical links in accordance with the distribution.

In some embodiments, the data transmission circuitry includes a main card and a plurality of line cards, which are connected to the main card by respective traces, the line cards having ports connecting to the physical links and including concentrators for multiplexing the data between the physical links and the traces in accordance with the distribution determined by the distributor. In one embodiment, the plurality of line cards includes at least first and second line cards, and the physical links included in the logical link include at least first and second physical links, which are connected respectively to the first and second line cards. Typically, the safety margin is selected to be sufficient so that the guaranteed bandwidth is provided by the logical link subject to one or more of a facility failure of a predetermined number of the physical links and an equipment failure of one of the first and second line cards.

There is further provided, in accordance with an embodiment of the present invention, apparatus for establishing a connection with a guaranteed bandwidth for transmitting data between first and second endpoints over a logical link that includes a plurality of parallel physical links between the endpoints, the apparatus including:

a controller, which is adapted to receive a measure of fluctuation that occurs in a rate of transmission of the data over the physical links when the data are distributed for transmission among the physical links, and to allocate a link bandwidth on each of the physical communication links for use in conveying the data between the endpoints such that the allocated link bandwidth includes a predefined safety margin based on the measure of fluctuation, so that a sum of the allocated link bandwidth over the plurality of the parallel physical links is substantially greater than the guaranteed bandwidth of the connection;

a distributor, which is adapted to determine a distribution of the data for transmission among the physical links in accordance with the allocated link bandwidth; and data transmission circuitry, which is adapted to transmit the data over the physical links in accordance with the distribution.

The present invention will be more fully understood from the following detailed description of the embodiments thereof, taken together with the drawings in which:

DETAILED DESCRIPTION OF EMBODIMENTS

Figure 1:
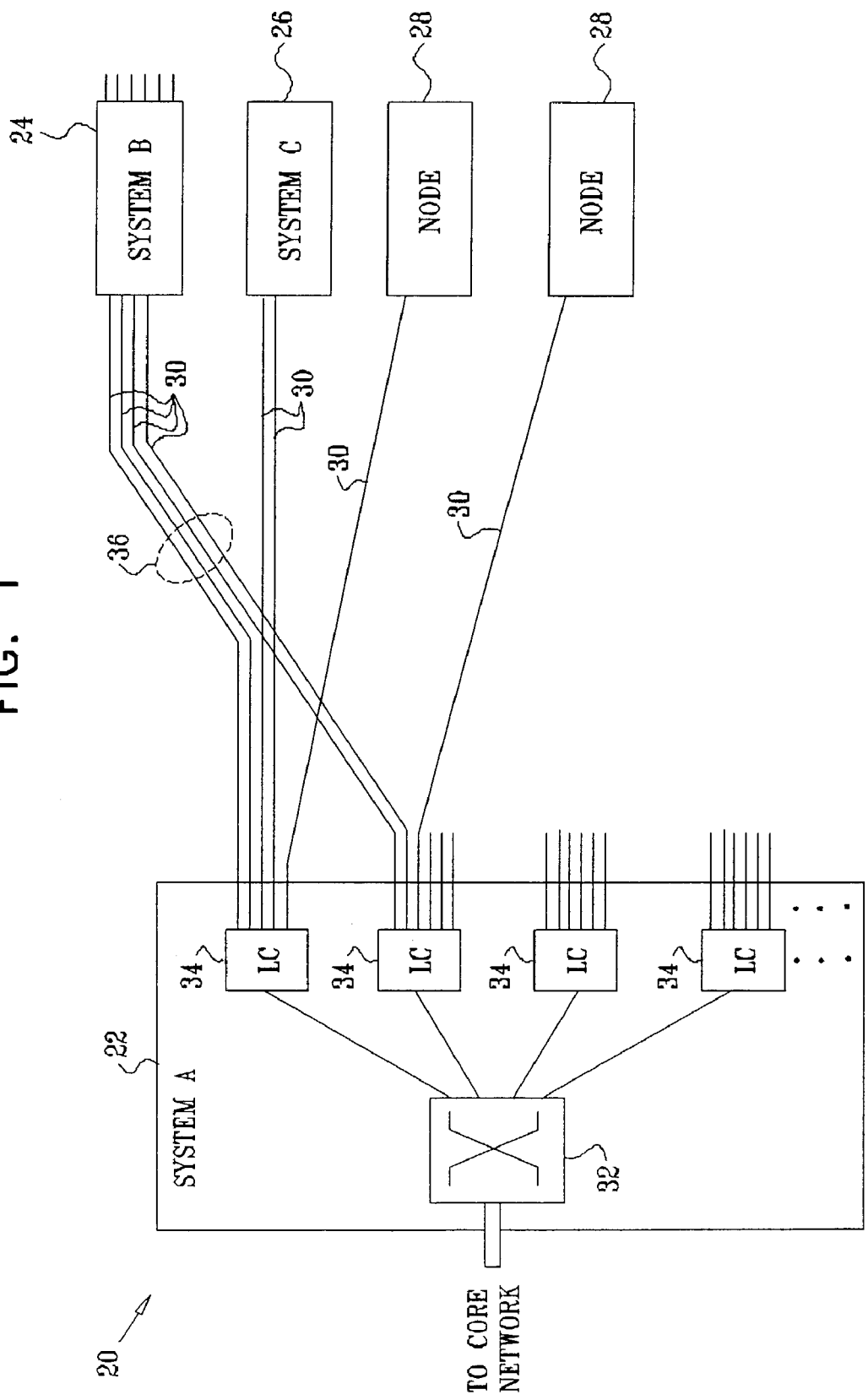
FIG. 1 is a block diagram that schematically illustrates a network communication system with link aggregation, in accordance with an embodiment of the present invention.

FIG. 1 is a block diagram that schematically illustrates elements of a communication system 20, in accordance with an embodiment of the present invention. In this example, central office equipment 22 communicates with customer nodes 24, 26, 28, . . . , over physical links 30. Links 30 typically comprise full-duplex Ethernet links, such as 10BASE-n, 100BASE-n or Gigabit Ethernet links, as are known in the art. (Alternatively, as noted above, other types of physical links may be used, such as ATM or PPP links.) Equipment 22 is configured to convey packet data traffic between the customer nodes and a network (which may be a metro network, access network, or other type of core network, for example). For this purpose, equipment 22 comprises a main switching card 32, which is connected to multiple line cards 34 that serve links 30. Details of the structure and operation of equipment 22 are shown below in FIG. 2 and are described with reference thereto.

Equipment 22 and certain customer nodes, such as nodes 24 and 26, are configured to serve as aggregation systems in accordance with the above-mentioned Clause 43 of the 802.3 standard. (Equipment 22 and nodes 24 and 26 are accordingly labeled as System A, B and C, respectively.) For example, an aggregation group 36 of four physical links is defined between equipment 22 and node 24. Another aggregation group of two physical links may be defined between equipment 22 and node 26. Each aggregation group (as well as each non-aggregated link 30) may serve multiple customer connections between the respective customer node and equipment 22.

Figure 2:
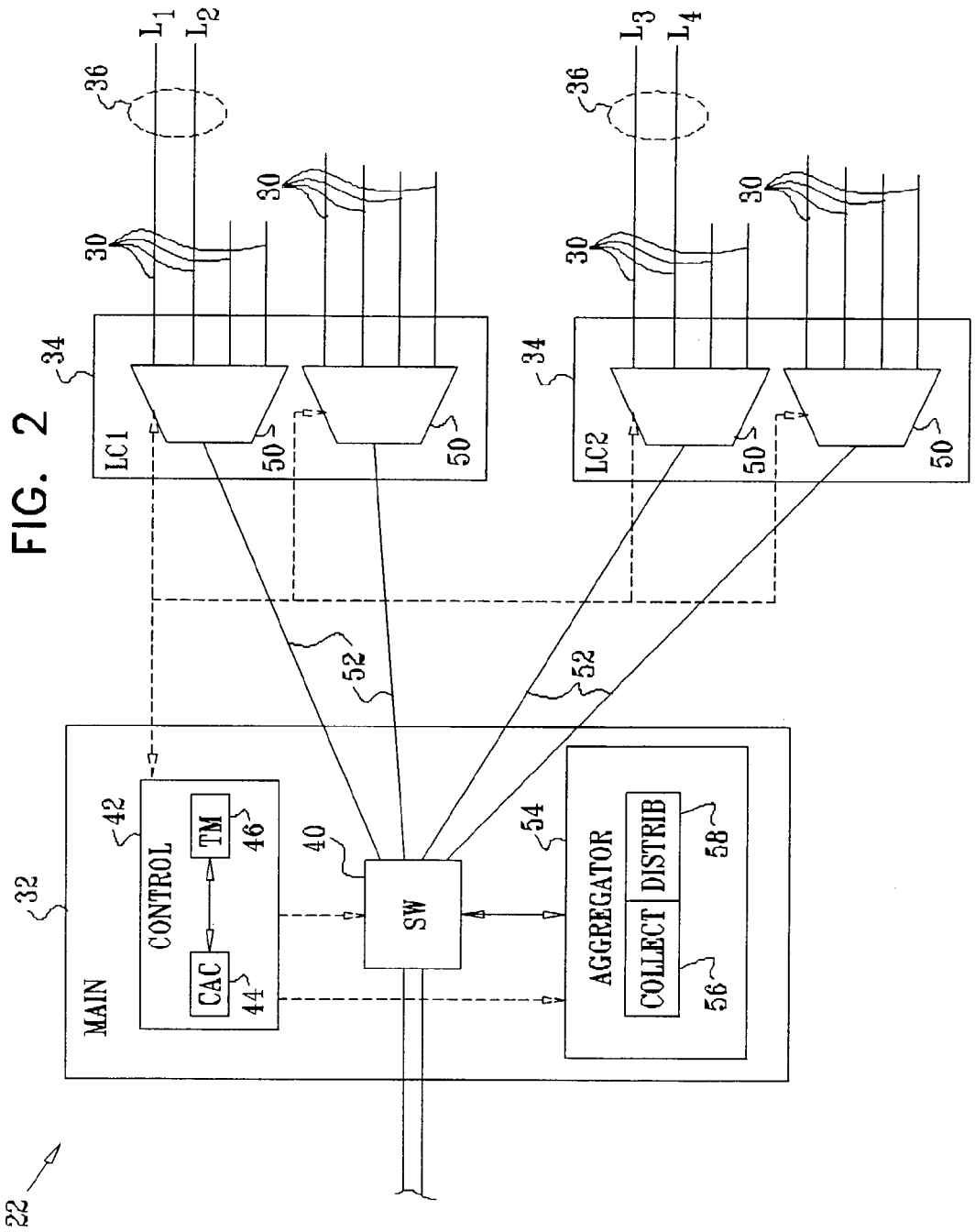
FIG. 2 is a block diagram that schematically shows details of communication equipment with link aggregation capability, in accordance with an embodiment of the present invention.

FIG. 2 is a block diagram that schematically shows details of equipment 22, in accordance with an embodiment of the present invention. Main card 32 comprises a switching core 40, which switches traffic to and from line cards 34. Two line cards 34, labeled LC1 and LC2, are shown in the figure. The operation of switch 40 is managed by a controller 42, typically an embedded microprocessor with suitable software for carrying out the functions described herein.

A Connection Admission Control entity (CAC) 44, typically a software process running on controller 42, manages the allocation of bandwidth in equipment 22. CAC 44 is responsible for ensuring that all connections between equipment 22 and customer nodes 24, 26, 28, . . . , (shown in FIG. 1) receive the amount of guaranteed bandwidth to which they are entitled, as well as for allocating any excess bandwidth available above the guaranteed minimum. For this purpose, CAC 44 maintains records that include:

Throughput of equipment 22.

Guaranteed and allocated excess bandwidth of each connection, as required by the applicable service level agreement.

Overbooking ratio that the service provider who operates equipment 22 is prepared to use in allocating the available excess bandwidth.

Safety factors to apply in determining bandwidth allocation on links in aggregation groups, as described below.

Based on these records, CAC 44 decides whether to admit each request received by equipment 22 to set up a new connection, and allocates resources (such as bandwidth) to the connection accordingly. A "connection" is defined as a flow of data packets between two systems in a network, such as Systems A and B in FIG. 1. Such a flow may carry multiple conversations. All conversations on a given connection share the same bandwidth and are treated in a substantially identical manner by equipment 22. If a new connection requires more bandwidth than equipment 22 has available, the CAC rejects the request.

Each line card 34 comprises one or more concentrators 50, which comprise multiple ports that serve respective links 30. The concentrators multiplex data traffic between links 30 and traces 52, which connect the concentrators to switching core 40. Typically, main card 32 and line cards 34 are arranged in a card rack and plug into a printed circuit back plane, (not shown) which comprises traces 52. The bandwidth of each trace 52 may be less than the total bandwidth available on links 30 that are connected to the respective concentrator 50, based on considerations of statistical multiplexing. To prevent overloading of traces 52, concentrators 50 may limit the rate of incoming data admitted on each link 30 so that it remains between a predetermined minimum, which is determined by the guaranteed bandwidth of the connections on the link, and a maximum, which is determined by the peak bandwidth (guaranteed plus permitted excess bandwidth) of the connections on the link. A traffic manager 46, which may also be a software process on controller 42, receives information regarding the operational status of links 30 (for example, link or equipment failures) and updates the data rate limits applied by concentrators 50, based on the status information and the bandwidth allocations made by CAC 44.

An aggregator 54 controls the link aggregation functions performed by equipment 22. A similar aggregator resides on node 24 (System B in FIG. 1). Aggregator 54, too, may be a software process running on controller 42 or, alternatively, on a different embedded processor. Further alternatively or additionally, at least some of the functions of the aggregator may be carried out by hard-wired logic or by a programmable logic component, such as a gate array. In the example shown in FIG. 2, aggregation group 36 comprises links L1 and L2, which are connected to LC1, and links L3 and L4, which are connected to LC2. This arrangement is advantageous in that it ensures that group 36 can continue to operate in the event not only of a facility failure (i.e., failure of one of links 30 in the group), but also of an equipment failure (i.e., a failure in one of the line cards). As a result of spreading group 36 over two (or more) line cards, the link aggregation function applies not only to links 30 in group 36 but also to traces 52 that connect to multiplexers 50 that serve these links. Therefore, aggregator 54 resides on main card 32. Alternatively, if all the links in an aggregation group connect to the same multiplexer, the link aggregation function may reside on line card 34.

Aggregator 54 comprises a distributor 58, which is responsible for distributing data frames arriving from the network among links 30 in aggregation group 36. Typically, distributor 58 determines the link over which to send each frame based on information in the frame header, as described in the Background of the Invention. Preferably, distributor 58 applies a predetermined hash function to the header information, wherein the hash function satisfies the following criteria:

The hash value output by the function is fully determined by the data being hashed, so that frames with the same header will always be distributed to the same link.

The hash function uses all the specified input data from the frame headers.

The hash function distributes traffic in an approximately uniform manner across the entire set of possible hash values The hash function generates very different hash values for similar data.

For example, distributor 58 may implement the hash function shown below in Table I:

TABLE I

DISTRIBUTOR HASH FUNCTION

```
unsigned short hash(unsigned char *hdr, short lagSize)
{
short i;
unsigned short hash=178;  // initialization value
for (i=0; i<4; i++)       // hdr is 4 bytes length
    hash = (hash<<2) + hash + (*hdr>>(i*8) & 0xFF);
return (hash % lagSize)
}
```

Here hdr is the header of the frame to be distributed, and lagSize is the number of active ports (available links 30) in link aggregation group 36. Alternatively, distributor 58 may use other means, such as look-up tables, for determining the distribution of frames among links 30.

Aggregator 54 further comprises a collector 56, which collects data frames that were received over different links 30 in group 36, and arranges the frames back into a single traffic stream.

When CAC 44 receives a request to open a connection with guaranteed bandwidth B over an aggregation group of N links, it might be assumed that the CAC should simply allocate bandwidth of B/N on each link. In practice, however, even if the hash function applied by distributor 58 meets the criteria outlined above, statistical variations in the traffic itself are likely to cause a larger portion of the traffic to be distributed to some of the links in the group than to others. In other words, some of the links may be required at times to carry group traffic with bandwidth substantially greater than B/N. As a result, these links may not have sufficient capacity remaining to provide bandwidth that has been guaranteed to other connections that the CAC has committed to carry over these links. When an aggregation group extends over a number of concentrators 50 (as in the case of group 36), the traffic load on traces 52 may also be unbalanced. Overloading of traces 52 may likewise lead to a failure of system 22 to provide guaranteed bandwidth levels, in the distribution and/or the collection direction.

A similar problem may arise if there is a failure in a link in an aggregation group or in one of a number of line cards serving the aggregation group. In this case, to maintain the bandwidth allocation B made by CAC 44, each of the remaining links in the group must now carry, on average, B/(N−M) traffic, wherein M is the number of links in the group that are out of service. If only B/N has been allocated to each link, the remaining active links may not have sufficient bandwidth to continue to provide the bandwidth that has been guaranteed to the connections that they are required to carry. A similar problem arises with respect to loading of traces 52. For example, if there is a failure in LC2 or in one of links 30 in group 36 that connect to LC2, the trace connecting the multiplexer 50 in LC1 will have to carry a substantially larger share of the bandwidth, or even all of the bandwidth, that is allocated to the connection in question.

Figure 3:
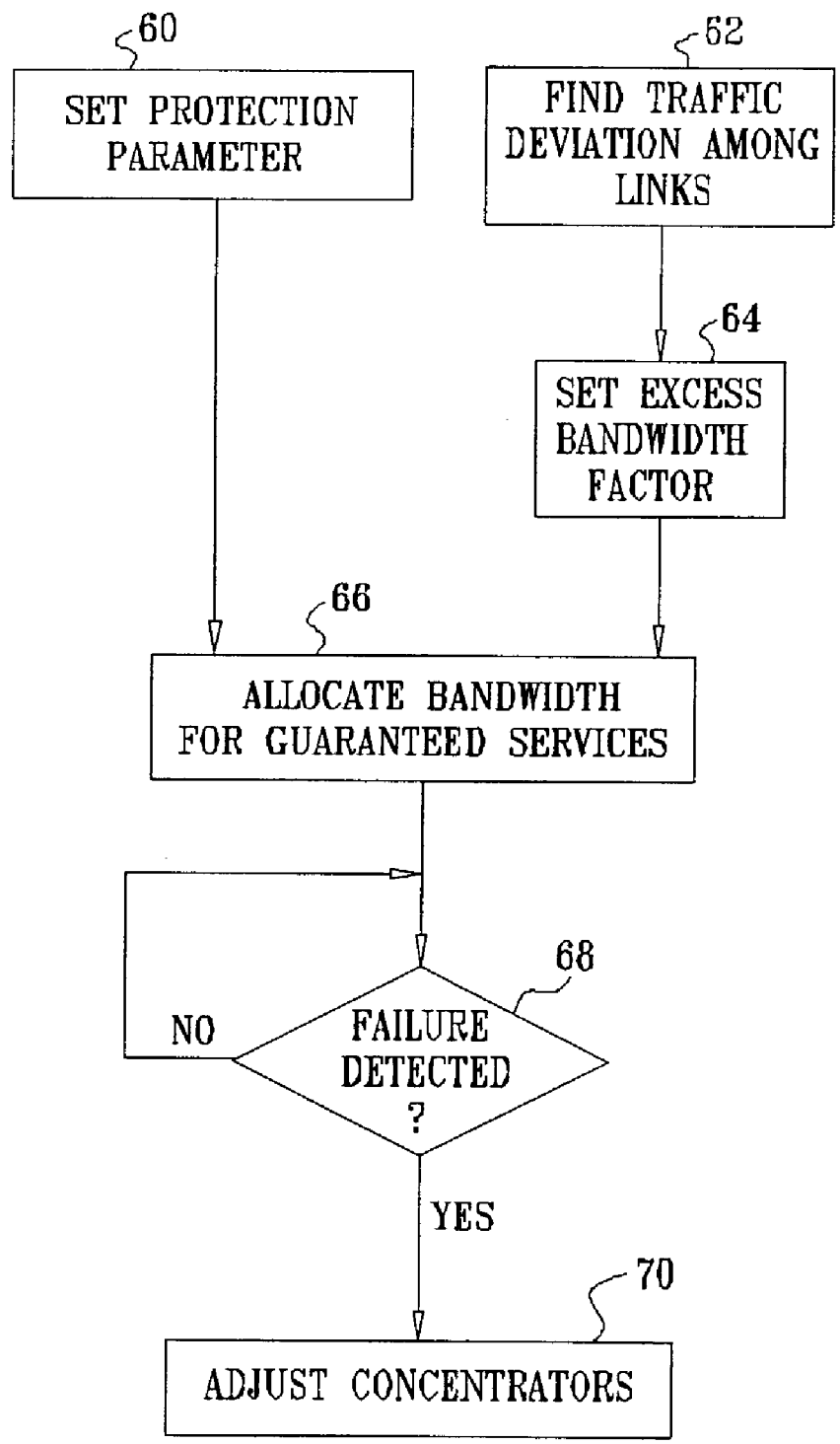
FIG. 3 is a flow chart that schematically illustrates a method for allocating bandwidth in a link aggregation group, in accordance with an embodiment of the present invention.

FIG. 3 is a flow chart that schematically illustrates a method for dealing with these problems of fluctuating bandwidth requirements, in accordance with an embodiment of the present invention. In order to provide sufficient bandwidth for failure protection, CAC 44 (shown in FIG. 2) uses a safety margin based on a protection parameter P, which is assigned at a protection setting step 60. P represents the maximum number of links in the group that can be out of service while still permitting the aggregation group to provide a given connection with the bandwidth that has been guaranteed to the connection. CAC 44 will then allocate at least B/(N−P) bandwidth to each link in the group, so that if P links fail, the group still provides total bandwidth of (N−P)*B/(N−P)=B. Setting P=1 is equivalent to 1:N protection, so that the group will be unaffected by failure of a single link. In the example of group 36, shown in FIG. 2, setting P=2 will give both facility and equipment protection, i.e., the group will be unaffected not only by failure of a link, but also by failure of one of line cards 34. In the extreme case, in which P=N−1, CAC 44 will allocate the full bandwidth B on each link in the group.

In order to account for statistical fluctuations in the bandwidth consumed on the different links in the aggregation group, a measure of these fluctuations is determined, at a deviation calculation step 62. For example, the standard deviation provides a useful a measure of the fluctuation of the actual bandwidth relative to the mean B/N (or B/(N−P)). It may be found by on-line measurement of the actual traffic flow on the links in the group or by off-line simulation or analytical calculation. Alternatively, the utilization of each link in the link aggregation group may be measured, and these measurements may be used to calculate the average utilization of the links and the actual maximum difference between the utilization of the most-loaded link and the average. In general, a connection characterized by long conversations will tend to have large fluctuations, since each conversation must be conveyed in its entirety over the same link. Connections carrying many short, different conversations will generally have small fluctuations.

To provide sufficient excess bandwidth for these statistical fluctuations, CAC 44 (shown in FIG. 2) uses a safety margin based on a fluctuation factor F, which is assigned at a fluctuation setting step 64. F is calculated based on the standard deviation or other measure of fluctuation found at step 62. CAC 44 will then allocate at least F*B/N bandwidth to each link in the aggregation group. For example, for a given standard deviation a, the value $F=1+3\sigma$ will provide sufficient bandwidth to cover nearly all the statistical fluctuations on the links. As another example, F may be given by the actual, measured maximum difference between the utilization of the most-loaded link and the average utilization. Larger or smaller factors may be used, depending on service level agreements and other constraints, Clearly, however, $F \leq N$, since the total bandwidth allocated on any one of the links in the group need not be any greater than the guaranteed total bandwidth B for the connection in question.

Based on the safety margins determined at steps 60 and 64, CAC 44 (shown in FIG. 2) allocates guaranteed bandwidth to each connection in a link aggregation group, at a bandwidth allocation step 66. To provide a shared safety margin for both failure protection and statistical bandwidth fluctuations, each link is preferably assigned a link bandwidth:

$$B_{LINK} = \min\{B, F*B/(N-P)\} \quad (1)$$

This is the bandwidth that the CAC allocates to each link in the link aggregation group. Traffic manager 46, however, may limit the actual data rate of each link to be no greater than $B_{LINK} = \min\{B, F*B/(N-X)\}$, wherein X is the number of failed links, $X \leq P$. This latter limit prevents the link aggregation group from taking more than its fair share of bandwidth relative to other connections that share the same trace 52. In any case, the sum of guaranteed bandwidth on all connections sharing any given trace 52 may not exceed the trace capacity. CAC 44 may overbook the excess bandwidth remaining above the guaranteed limits, so that the total (peak) allocation exceeds the trace capacity. The connections on links 30, including any link aggregation groups, then compete for the remaining available bandwidth (typically in a weighted manner, based on the amount of excess bandwidth contracted for in the users' service level agreements, as is known in the art). By limiting the data rate of each link in the aggregation group to $\min\{B, F*B/(N-X)\}$, rather than $\min\{B, F*B/(N-P)\}$, traffic manager 46 leaves bandwidth available for other connections that share the same trace.

Once CAC 44 (shown in FIG. 2) has allocated bandwidth for a given connection on a link aggregation group, normal data transmission proceeds. The bandwidth allocations apply to the amount of guaranteed traffic carried on each link 30 in the group. (Note that different allocations and separate traffic management may apply to outgoing traffic generated by distributor 58 and incoming traffic, which is sent by nodes 24, 26, . . . , shown in FIG. 1, and processed by collector 56.) The allocations also affect the bandwidth used on traces 52. The rate limiting function of concentrators 50 is set to allow for the traffic bandwidth that may be used on each of links 30 that feed the respective trace. As noted above, in allocating the bandwidth, CAC 44 ensures that the sum of the guaranteed bandwidth on all links sharing a given trace 52 is no greater than the trace bandwidth. The sum of the excess bandwidth allocated on the links, however, may exceed the trace bandwidth. In this case, the excess traffic is typically buffered as necessary, and is transmitted over the trace during intervals in which one or more of the links are not transmitting their guaranteed traffic levels and the trace has bandwidth available, or dropped if the buffer capacity is exceeded.

Normal data transmission over the connection continues unless and until a failure is detected on one of links 30 or line cards 34 (FIG. 1), at a failure detection step 68. Traffic manager 46 (FIG. 2) is informed of the failure, and notifies distributor 58 accordingly to modify its hash function so that outgoing traffic is distributed over the remaining links in the group. Use of the protection parameter P in setting the bandwidth allocation ensures that (as long as no more than P links are out of service) there is sufficient bandwidth available for the connection on the remaining links. It may also be necessary for the traffic manager to adjust the rate limiting function of concentrators 50, at a concentrator readjustment step 70, in order to deal with the increased incoming traffic on the remaining links. For example, if link L4 (FIG. 2) fails, the traffic on each of links L1, L2 and L3 is expected to increase by ⅓, and the concentrator in LC1 will have to deal with the resulting increase in traffic on the corresponding trace 52.

Although the embodiments described above show a specific implementation of link aggregation bandwidth allocation and control in central office equipment 22, the methods used in this implementation may similarly be applied in a straightforward way in substantially any link aggregation system that operates in accordance with Clause 43 of the IEEE 802.3 standard. Furthermore, as noted above, the principles of the present invention may be applied, mutatis mutandis, in other types of link aggregation, such as Inverse Multiplexing over ATM (IMA) and multi-link connections using the Point-to-Point (PPP) protocol.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for establishing a connection with a guaranteed bandwidth for transmitting data between first and second endpoints, the method comprising:

defining a logical link comprising a plurality of parallel physical links between the endpoints;

determining a measure of fluctuation that occurs in a rate of transmission of the data over the physical links when the data are distributed for transmission among the physical links, wherein the fluctuation is due to a non-uniform distribution of load among the parallel physical links comprised in the logical link;

allocating a link bandwidth on each of the physical communication links for use in conveying the data between the endpoints such that the allocated link bandwidth comprises a predefined safety margin based on the measure of fluctuation, so that a sum of the allocated link bandwidth over the plurality of the parallel physical links is substantially greater than the guaranteed bandwidth of the connection; and conveying the data over the logical link by distributing the data for transmission among the physical links in accordance with the allocated link bandwidth.

2. The method according to claim 1, wherein defining the logical link comprises defining a link aggregation group in accordance with IEEE standard 802.3.

3. The method according to claim 1, wherein the physical links comprise Asynchronous Transfer Mode (ATM) links, and wherein defining the logical link comprises grouping the physical links for Inverse Multiplexing over ATM (IMA).

4. The method according to claim 1, wherein defining the logical link comprises defining a multi-link connection in accordance with a Point-to-Point (PPP) protocol.

5. The method according to claim 1, wherein the data comprise a sequence of data frames having respective headers, and wherein distributing the data comprises applying a hash function to the headers to select a respective one of the physical links over which to transmit each of the data frames.

6. The method according to claim 1, wherein the guaranteed bandwidth is a bandwidth B, and the link bandwidth allocated to each of the links is no less than F*B/N, wherein F is a factor determined by the measure of fluctuation.

7. The method according to claim 1, wherein determining the measure of fluctuation comprises finding a standard deviation of the rate of transmission.

8. The method according to claim 1, wherein determining the measure of fluctuation comprises finding a difference between an average level of utilization of all of the plurality of parallel physical links and a maximum level of utilization of any one of the physical links.

9. Apparatus for establishing a connection with a guaranteed bandwidth for transmitting data between first and second endpoints over a logical link that includes a plurality of parallel physical links between the endpoints, the apparatus comprising:
   a controller, which is adapted to receive a measure of fluctuation that occurs in a rate of transmission of the data over the physical links when the data are distributed for transmission among the physical links, wherein the fluctuation is due to a non-uniform distribution of load among the parallel physical links comprised in the logical link, and to allocate a link bandwidth on each of the physical communication links for use in conveying the data between the endpoints such that the allocated link bandwidth comprises a predefined safety margin based on the measure of fluctuation, so that a sum of the allocated link bandwidth over the plurality of the parallel physical links is substantially greater than the guaranteed bandwidth of the connection;
   a distributor, which is adapted to determine a distribution of the data for transmission among the physical links in accordance with the allocated link bandwidth; and
   data transmission circuitry, which is adapted to transmit the data over the physical links in accordance with the distribution.

10. The apparatus according to claim 9, wherein the logical link comprises a link aggregation group in accordance with IEEE standard 802.3.

11. The apparatus according to claim 9, wherein the physical links comprise Asynchronous Transfer Mode (ATM) links, which are grouped for Inverse Multiplexing over ATM (IMA).

12. The apparatus according to claim 9, wherein the logical link comprises a multi-link connection in accordance with a Point-to-Point (PPP) protocol.

13. The apparatus according to claim 9, wherein the data comprise a sequence of data frames having respective headers, and wherein the distributor is adapted to apply a hash function to the headers in order to select a respective one of the physical links over which to transmit each of the data frames.

14. The apparatus according to claim 9, wherein the guaranteed bandwidth is a bandwidth B, and the link bandwidth allocated to each of the links by the controller is no less than F*B/N, wherein F is a factor determined by the measure of fluctuation.

15. The apparatus according to claim 9, wherein the measure of fluctuation comprises a standard deviation of the rate of transmission.

16. The apparatus according to claim 9, wherein the measure of fluctuation comprises a difference between an average level of utilization of all of the plurality of parallel physical links and a maximum level of utilization of any one of the physical links.

17. The apparatus according to claim 9, wherein the data transmission circuitry comprises a main card and a plurality of line cards, which are connected to the main card by respective traces, the line cards having ports connecting to the physical links and comprising concentrators for multiplexing the data between the physical links and the traces in accordance with the distribution determined by the distributor.

18. The apparatus according to claim 17, wherein the plurality of line cards comprises at least first and second line cards, and wherein the physical links included in the logical link comprise at least first and second physical links, which are connected respectively to the first and second line cards.

* * * * *